[11] 3,559,924

| [72] | Inventor | Hans Jochner<br>Munich, Germany |
| --- | --- | --- |
| [21] | Appl. No. | 743,913 |
| [22] | Filed | July 1, 1968 |
| [45] | Patented | Feb. 2, 1971 |
| [73] | Assignee | Entwicklungsring Sud GmbH<br>Munich, Germany |
| [32] | Priority | July 5, 1967 |
| [33] |  | Germany |
| [31] |  | E34,317 and E34,318 |

[54] MOUNTING ASSEMBLY FOR AN ADJUSTABLE SWEPTBACK AIRCRAFT WING
14 Claims, 6 Drawing Figs.

[52] U.S. Cl. .................................................. 244/46,
308/135
[51] Int. Cl. ................................................. B64c 3/40
[50] Field of Search ......................................... 244/46; -
308/(Inquired)

[56] References Cited
UNITED STATES PATENTS

| 3,023,984 | 3/1962 | Brennan ..................... | 244/46 |
| 3,279,721 | 10/1966 | Dethman ..................... | 244/46 |
| 3,292,881 | 12/1966 | Ricard ........................ | 244/46 |
| 3,451,646 | 6/1969 | Oarnaes ...................... | 244/46 |

*Primary Examiner*—Milton Buchler
*Assistant Examiner*—Jeffrey L. Forman
*Attorney*—William K. Serp ABSTRACT: A pivotable mounting apparatus to facilitate the wing adjustment of a sweptback wing aircraft. Secured to the fuselage of the aircraft and projecting outwardly therefrom is a pair of parallel support arms. Each arm is bifurcated and defines two parallel disposed prongs. The base of the wing adjacent the aircraft is provided with a pair of stub members. Each member is slidably positionable between one pair of the support arm prongs. The mating surfaces between the support arm and the wing stubs are provided with suitable bearings so as to permit relative motion between the wing and the fuselage. Spanning the outermost ends of the innermost support arm prongs is a reinforcing web. Similarly, the stubs projecting from the base of the wing are also spanned by a reinforcing web. Secured to the support arm web and the wing stub reinforcing web is a bearing means which serves to absorb the axial thrust created by the wing during flight.

PATENTED FEB 2 1971 3,559,924
SHEET 1 OF 3
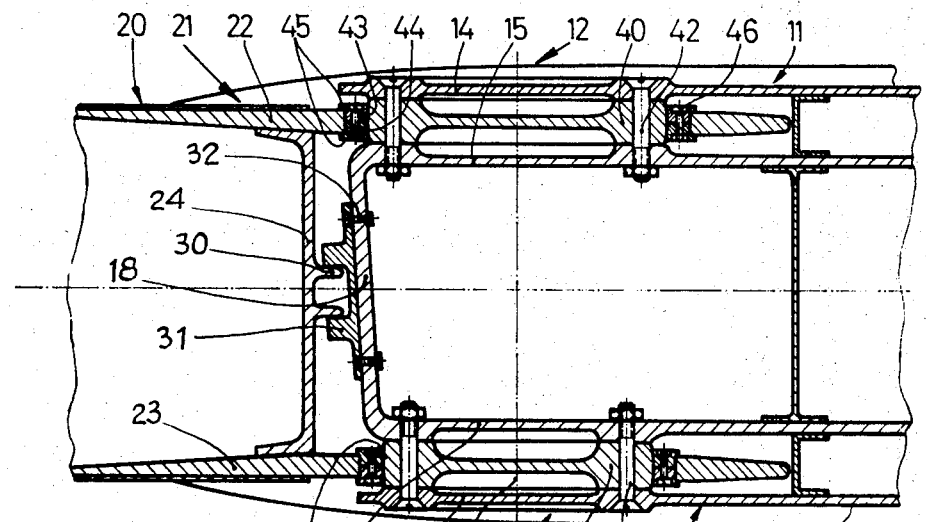
FIG.1
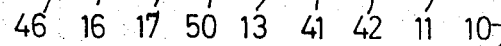
FIG.2
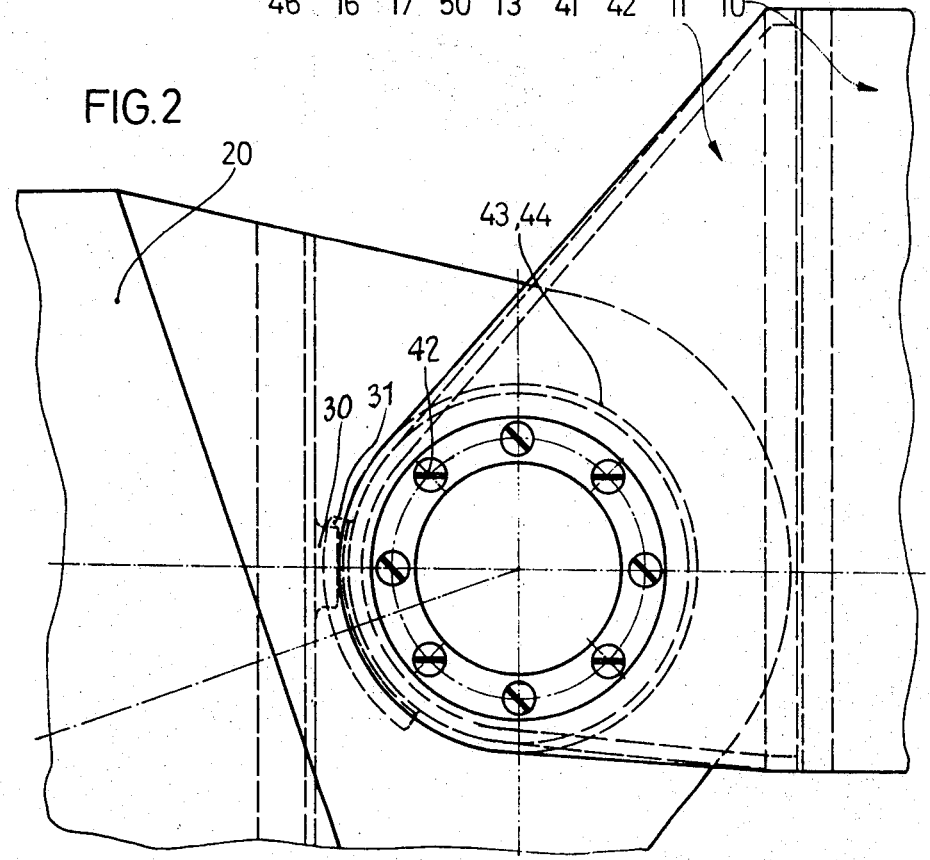

3,559,924

MOUNTING ASSEMBLY FOR AN ADJUSTABLE SWEPTBACK AIRCRAFT WING

BACKGROUND OF THE INVENTION

This invention relates to a pivot mounting for an adjustable sweptback aircraft wing and more particularly relates to a pivot mounting including two bearing assemblies. A first bearing assembly is associated with a bifurcated support arm secured to the airframe upon which the base of the wing is mounted. A second bearing assembly is associated with reinforcing webs spanning the wing support arm and the wing stub and serves to distribute the axial forces created during flight. The illustrated embodiment is particularly suitable for use with high performance aircraft to provide a means for varying the wing loading in response to speed variations.

Various pivot mountings have heretofore been devised and have usually featured thrust discs positioned to absorb the transverse forces produced. Alternatively, plain bearings have been used. However, such prior constructions have created considerable problems during the assembly of the wings onto the aircraft.

A main purpose of the invention is to provide a wing pivot mounting which facilitates assembly of the wing to the aircraft and provides a degree of separation between the absorption of the radial and axial forces produced at the mounting by the wing. An additional object of the invention is to provide a mounting assembly having considerably lighter structure than heretofore known arrangements and wherein the bearings are individually supported. Such features provide a larger distance between bearings which results in optimum convenience during assembly and maintenance. The illustrated embodiment accomplishes these features by providing two bifurcated support arms which are secured to the airframe of the aircraft. The arms are spanned by a web which is secured to oppositely disposed surfaces of the arms. Secured to the web is a thrust bearing. If desired, the bearing connection at the wing fittings may be shaped in the form of a box by means of webs and may then be provided with a radial bearing.

In accordance with the illustrated embodiments, the vertical wing pivot bearing assembly includes a bearing and webs. The web spans the support arms. The bearing so defined cooperates with a bearing fixed upon a second web spanning the wing base projections and serves to absorb axial thrust forces. Further, the bearing rings, which absorb the radial forces, are arranged between the wing elements and serve as axes of rotation for the wings with respect to the wing support elements. In addition, the webs which serve to absorb the forces acting parallel to the pivot axis include means which form a sliding bearing having a replaceable ring segment. Furthermore, the ring segments which serve as a rotational axis are positively fixed to the web at the fuselage. In a preferred embodiment of this invention, the bearing rings which serve to absorb radial forces are split and positively connected in pairs.

With respect to an alternate embodiment, the thrust bearing consists of two ring segments; that is, a guiding ring segment which is removable and a guided ring segment which is permanently fixed to the web of the bearing. The bearing which absorbs the radial forces in this embodiment consists of a single annular bushing positively connected to the wing pivot fitting and additionally includes several annular bearings supported between the prongs of the bifurcated support arms. Thus, as a result of the relatively wide spacing between bearings, considerably lower loads are imposed upon the bearings than would otherwise be the case.

Further, in accordance with an embodiment of the illustrated invention, it is suggested that the inner bearing ring and the outer bearing ring consist of two bearing members positively attached and, further, that the members be eccentric. The inner member is coated with a self-lubricating plastic such as that sold under the trademark "TEFLON" and is spherically shaped. The outer bearing member displays conical side faces. As will hereinafter be more completely described, the bearings are easily adjustable and are relatively maintenance free. Furthermore, should the outer bearing ring display excessive wear, such adjustment can readily be made by means of the conical shape of the side faces, as will be further described.

A main object of this invention is to provide an improved wing mounting assembly for aircraft having adjustable sweptback wings. Other objects and advantages will become apparent with reference to the following description and accompanying drawings which show two illustrative embodiments of this invention.

BRIEF DESCRIPTION OF THE DRAWINGS

FIG. 1 is a partial, cross-sectional view of a wing mounting assembly of an aircraft having adjustable sweptback wings in accordance with this inventon.

FIG. 2 is a top view of the mounting assembly illustrated in FIG. 1.

DESCRIPTION OF THE PREFERRED EMBODIMENTS

Figure 3:
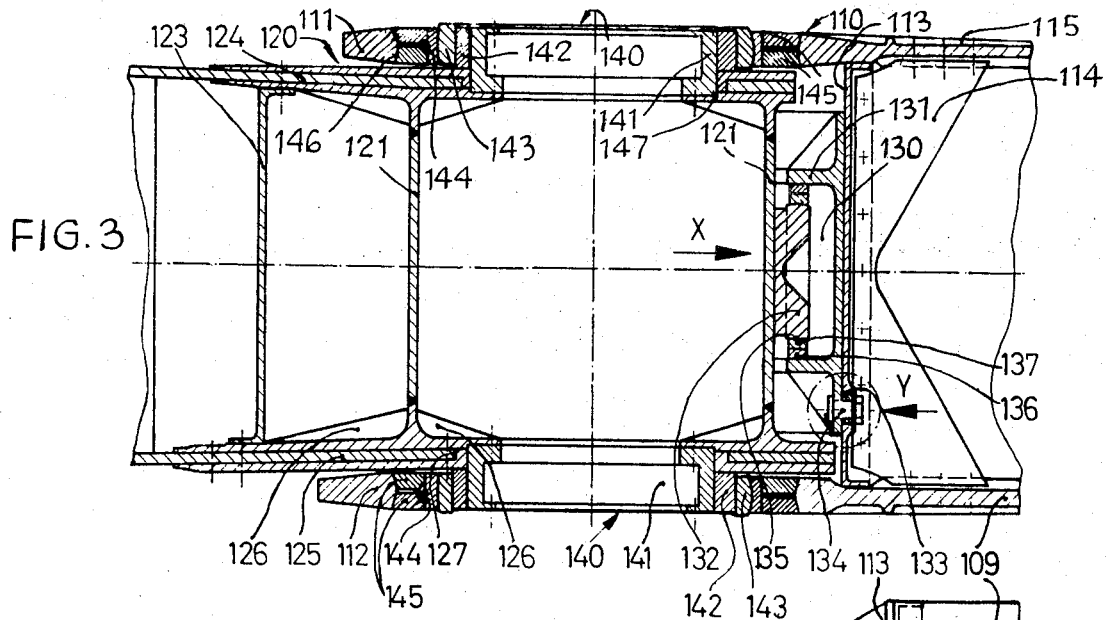
FIG. 3 is a partial, cross-sectional view of a wing mounting assembly of an aircraft having adjustable sweptback wings in accordance with an alternate embodiment of this invention.

Secured to a projection 10 from the side of the aircraft fuselage is a pair of bifurcated support arms 11 defining projecting members 12 and 13. Similarly, the base 21 of the wing 20 is also forked providing parallel stubs 22 and 23. The stubs each define circular openings. The projecting members 12 and 13 of the support arms 11 are also bifurcated and provide parallel disposed prongs 14, 15, 16, and 17.

The prongs 15 and 16 are connected together by means of a spanning web 18 which serves to absorb the axial forces. Spanning the prongs 22 and 23 is a support web 24 which carries upon its outwardly disposed surface a pair of parallel bearing projections 30. The outer surfaces of the projections 30 are in contact with the inwardly disposed surfaces of a bearing channel 31. The projections 30 and the channel 31 provide a plain bearing which absorbs the axial forces produced by the wing. In order to provide for easy and quick assembly, the channel 31 is detachably secured to the web 18 by screws 32 or other suitable fastening means. As illustrated, the channel 31 is positioned upon the web 18 so as to straddle the projections 30.

Serving to absorb the transmission of the radial forces are bearing discs 40 and 41 which are located between the pairs of prongs 14, 15 and 16, 17. The ring elements are rigidly secured to these prongs by flat head machine screws 42 or other suitable means.

It should be noted that as a result of the illustrated construction, the screws 42 are subjected primarily to shear stress, thereby allowing the use of screws having a relatively small size. About the periphery of the discs 40 and 41 are a pair of annular bearing sleeves 43 and 44. A particular feature of the illustrated embodiment is that the bearing is of relatively light weight. Serving to accomplish this end, the peripheral edges of the discs are coated with a self-lubricating plastic such as that sold under the trademark "TEFLON" so that the bearings require no additional lubrication.

The annular bearing sleeves 43 and 44 are secured by screws 46. Fitted upon the ends of the sleeves are washers 45 which cover the screw holes drilled in the projections 22 and 23. A particular feature of the illustrated embodiment is that relatively few bearing surfaces are highly finished. For example, with respect to the bearing sleeves 43 and 44, only the side face 46 is finished to a high degree. The outer surface of the face is, of course, cylindrical in shape and serves to prevent possible stresses during assembly, while the screw 46 creates a certain amount of prestressing of the sleeves.

Figure 4:
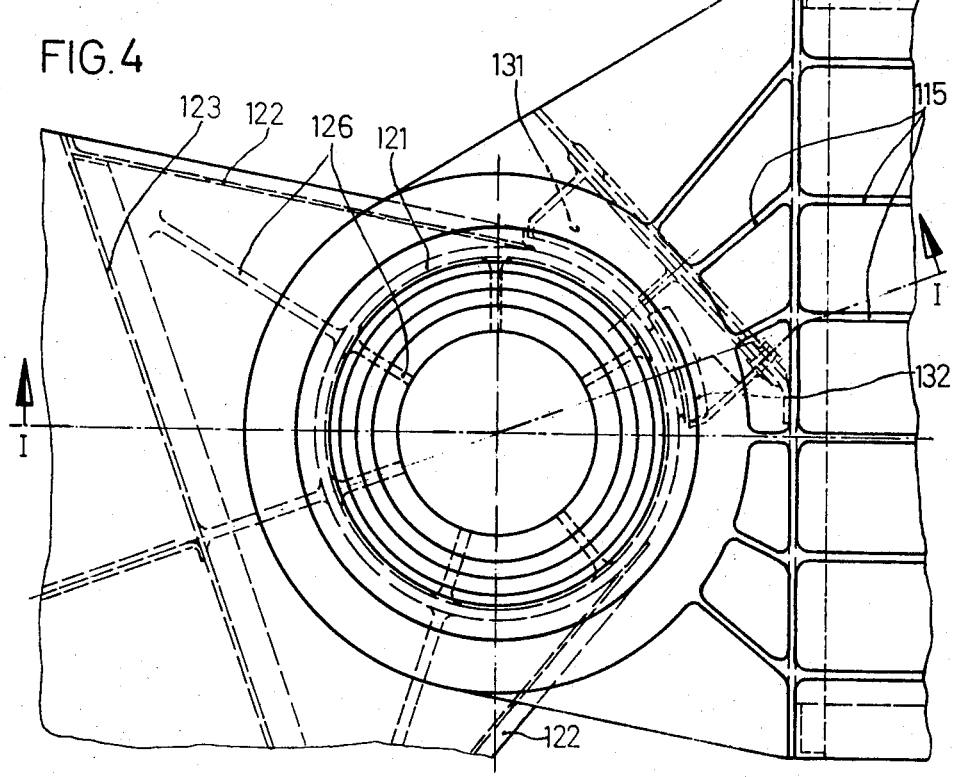
FIG. 4 is a top view of the mounting assembly illustrated in FIG. 3.
Figure 5:
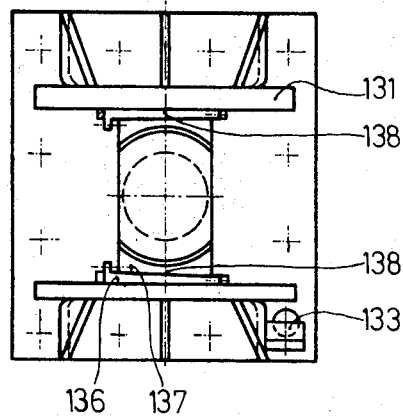
FIG. 5 is a fragmentary view of a component of the assembly illustrated in FIG. 3 taken along the arrow X.
Figure 6:
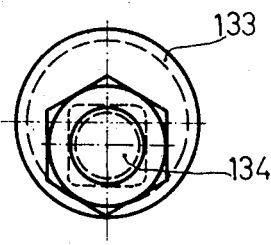
FIG. 6 is an enlarged, detailed view of a component of the assembly illustrated in FIG. 3 taken along the arrow Y.

With regard to the alternate embodiment illustrated in FIGS. 3 through 6, a bifurcated support arm 110 is secured to the side of the fuselage and includes two parallel, outwardly extending, flat prongs 111 and 112 which are spanned by a web 113. The web 113 is further reinforced by struts 114, as is the arm 110 by ribs 115.

The base end of the wing includes parallel, spatially adjacent stub projections 124 and 125 which form a part of the wing support mounting 120. The wing support mounting 120 forms an enclosed, substantially rectangular arrangement by means of webs 122. The webs 122 are positioned parallel to the outer edges of the projections 124 and 125 by a cylindrical web 121 and a transverse web 123. Additional reinforcing ribs are also used with respect to the mounting 120. The rotary connection between the two members 110 and 120 consists of a radial disc bearing 140. The bearing 140 includes bushings 141 and bearing rings 142, 143, 144, and 145.

The bushing 141 is maintained within a circular opening 147 defined by the web 121 and is rigidly attached to it and thus resists twisting forces. The bushing 141 engages with the bearing rings 142, 143, 144, and 145 located within the opening defined by the prongs 111 and 112 of the pivot fitting 110. The outer ring of the bearing is preferably constructed as a unit and consists of two positively connected rings 145.

The bore of the assembled bearing ring 145 is eccentric, as is that of the inner ring of the bearing 142. As a result of this eccentric construction, a high degree of adjustability is obtained. The sliding surface of the bearing ring 143 is spherical and preferably Teflon-coated, whereas the ring 144 is split to permit prestressing. All radial forces are absorbed by this two-part bearing configuration, whereas the axial forces are absorbed by the thrust bearing 130. Each of the bearings 130 and 140 substantially absorbs only one force component and thus provides an efficient design.

According to the illustrated alternate embodiment of the invention, the thrust bearing 130 consists of an inner guide segment 132 and an outer guide segment 131 which can be removed and adjusted within certain limits. The inner guide segment 132 is fixed to the ring-type web 121 and cylindrically ground at the sliding surfaces 135 so as to minimize stress. The sliding surfaces rest in bearing slides 136 and 137, the facing contact surfaces 138 (FIG. 5) of which are wedge shaped. By means of adjusting screws and centering bolts (not illustrated), each pair of bearing slides 136 and 137 can be adjusted and set without backlash. Thus, the bearing backlash of the fixed ring segment 132 may be compensated in a simple manner. The invention provides for adjustment of the removable ring segment 131 which serves to absorb thrust forces. In this regard, with particular reference to FIG. 6, the positive attachment of the segment 131 to the web 113 is obtained by means of a bolt 134 located in an eccentric bushing 133, as is the eccentric adjustment of bearing rings 145 and 142.

The bifurcated configuration of the wing pivot results in relatively large bearing separation which reduces weight and facilitates maintenance of the wing mount. Also, the assembly operations are considerably simplified by means of the improved adjustment and centering features of the illustrated embodiment.

Although only two embodiments of this invention have been herein shown and described, it should be understood that certain details of the construction shown may be altered without departing from the spirit and scope of this invention as defined by the following claims.

I claim:

1. A mounting apparatus for a variable sweep aircraft wing comprising two parallel, spatially disposed support arms projecting from the side of the aircraft fuselage, a reinforcing web spanning each of said support arms serving to absorb substantially transverse forces, a pair of parallel, spatially positioned support stubs projecting from the base of the wing and interleaved with said support arms whereby each stub mates with a respective support arm, radial bearing means connecting each of said wing stubs and its respective support arm for pivotal movement of said wing relative to said fuselage, and thrust bearing means between said wing and said fuselage separate from and spaced from said radial bearing means, said support arms and said stubs for absorbing axial forces exerted on said wing relative to said fuselage.

2. A mounting apparatus in accordance with claim 1 wherein each of said support arms is bifurcated defining two parallel disposed prongs, and wherein each of said wing stubs is positioned between the prongs of one of said support arms.

3. An apparatus in accordance with claim 1 including a reinforcing web spanning said wing stubs and wherein said thrust bearing includes a bearing surface on said support arm reinforcing web disposed toward said wing, and a bearing surface on said wing stubs reinforcing web disposed toward said fuselage for cooperating with said support arm reinforcing web bearing surface.

4. An apparatus in accordance with claim 3 wherein each of said thrust bearing surfaces defines a channel, the walls of each channel being in sliding contact with the walls of the cooperating channel.

5. An apparatus in accordance with claim 4 wherein said radial bearing means are in the form of annular members which are readily removable to facilitate disassembly and reassembly of the mounting apparatus.

6. An apparatus in accordance with claim 5 wherein said annular members are detachably fastened to said support arms.

7. An apparatus in accordance with claim 6 wherein said radial bearing means further includes a pair of annular bearing rings which are secured together and positioned about the outer periphery of said annular member.

8. An apparatus in accordance with claim 7 wherein said annular members are coated with a self-lubricating material.

9. An apparatus in accordance with claim 1 which further includes a first web spanning said wing stubs positioned adjacent said support arm reinforcing web and a second reinforcing web spanning said wing stubs parallel and spatially positioned with respect to said first web, and said thrust bearing means being associated with the adjacent surfaces of said first web and said support arm spanning web.

10. An apparatus in accordance with claim 9 wherein said thrust bearing means comprises a pair of annular segments, one of said segments being removable and adjustable and the second of said segments being fixed to said first wing stub spanning web.

11. An apparatus in accordance with claim 10 wherein said radial bearing comprises an annular bushing and a plurality of annular ring bearings positioned about the outer surface of said bushing.

12. An apparatus in accordance with claim 11 wherein said annular ring bearings are coated with a self-lubricating material.

13. An apparatus in accordance with claim 11 wherein at least one of said annular ring bearings displays a conical outer face.

14. An apparatus in accordance with claim 11 wherein at least two of said annular ring bearings define eccentric openings.